US011060012B2

(12) United States Patent
Tatavalli-Mittadar et al.

(10) Patent No.: US 11,060,012 B2
(45) Date of Patent: Jul. 13, 2021

(54) DEPOSIT DISINTEGRATOR COMPOSITIONS

(71) Applicant: SHELL OIL COMPANY, Houston, TX (US)

(72) Inventors: Nirmal Tatavalli-Mittadar, Richmond, TX (US); Sunil Ashtekar, Houston, TX (US); Shekhar Jain, Houston, TX (US); Jian Lu, Bellaire, TX (US); Sujatha Degaleesan, Katy, TX (US); Kamran Akbar Zadeh, Katy, TX (US)

(73) Assignee: SHELL OIL COMPANY, Houston, TX (US)

( * ) Notice: Subject to any disclaimer, the term of this patent is extended or adjusted under 35 U.S.C. 154(b) by 248 days.

(21) Appl. No.: 16/092,420

(22) PCT Filed: Apr. 12, 2017

(86) PCT No.: PCT/US2017/027203
§ 371 (c)(1),
(2) Date: Oct. 9, 2018

(87) PCT Pub. No.: WO2017/180740
PCT Pub. Date: Oct. 19, 2017

(65) Prior Publication Data
US 2020/0325385 A1 Oct. 15, 2020

Related U.S. Application Data

(60) Provisional application No. 62/322,430, filed on Apr. 14, 2016.

(51) Int. Cl.
*C09K 8/524* (2006.01)
*B08B 9/027* (2006.01)
*F16L 55/24* (2006.01)

(52) U.S. Cl.
CPC .............. *C09K 8/524* (2013.01); *B08B 9/027* (2013.01); *F16L 55/24* (2013.01)

(58) Field of Classification Search
None
See application file for complete search history.

(56) References Cited

U.S. PATENT DOCUMENTS

| | | | |
|---|---|---|---|
| 3,640,824 A * | 2/1972 | Bucaram | C09K 8/524 507/90 |
| 3,830,737 A | 8/1974 | Friedman et al. | |
| 5,504,063 A | 4/1996 | Becker et al. | |
| 2005/0215437 A1* | 9/2005 | Shmakova-Lindeman | C09K 8/524 507/90 |
| 2010/0130389 A1 | 5/2010 | Lightford et al. | |
| 2010/0314117 A1 | 12/2010 | Li et al. | |
| 2015/0037202 A1* | 2/2015 | Harrington | C23F 11/16 422/7 |
| 2015/0152329 A1* | 6/2015 | Seetharaman | C07D 257/04 422/16 |

OTHER PUBLICATIONS

International Search Report and Written Opinion received for PCT Patent Application No. PCT/US2017/027203, dated Jun. 21, 2017, 11 pages.

* cited by examiner

*Primary Examiner* — John J Figueroa
(74) *Attorney, Agent, or Firm* — Shell Oil Company

(57) ABSTRACT

A solvent mixture comprising a solvent and a polar additive and associated methods.

20 Claims, 4 Drawing Sheets

DEPOSIT DISINTEGRATOR COMPOSITIONS

CROSS REFERENCE TO RELATED APPLICATIONS

This is a National stage application of International Application No. PCT/US2017/027203, filed Apr. 12, 2017, which claims the benefit of U.S. Provisional Application No. 62/322,430, filed Apr. 14, 2016, which is incorporated herein by reference.

BACKGROUND

The present disclosure relates generally to deposit disintegrator compositions. More specifically, in certain embodiments, the present disclosure relates to deposit disintegrator compositions useful in disintegrating deposits in subsea oil and gas pipelines and associated methods.

Oil and gas produced from wells frequently contain wax which may deposit in the wellbore and in equipment utilized for producing and transporting the oil and gas. The wax may also accumulate in pipelines, storage vessels, and other oil field equipment. The accumulation of wax and other deposits is a serious problem in that the deposits interfere with the production, transportation, storage, and processing of the oil and gas. In certain instances, the deposits may grow to a size where production is completely interrupted or flowline flow is stopped.

The problem of removing wax deposits from pumping wells and flowlines has been attacked in a number of ways. For example, flowlines may be cleaned mechanically, e.g. by scraping the flowlines with a pig. However, such methods may result in lost production time and high labor costs and may require special tools, the costs of which may be too expensive to be economically feasible methods to remove wax deposits.

Other common methods include cleaning flowlines with chemical solvents. Xylene is an example of a commonly used solvent used. While xylene may be effective in removing some deposits, xylene has a slow rate of deposit dissolution which reduces its effectiveness. In addition, xylene and other conventional solvent compositions may not be effective for use with all types of deposits.

It is desirable to develop a solvent composition that is more effective in disintegrating deposits than conventional solvents.

SUMMARY

The present disclosure relates generally to deposit disintegrator compositions. More specifically, in certain embodiments, the present disclosure relates to deposit disintegrator compositions useful in disintegrating deposits in subsea oil and gas pipelines and associated methods.

In one embodiment the present disclosure provides a solvent mixture comprising a solvent and a polar additive.

In another embodiment, the present disclosure provides a method comprising: providing a solvent mixture, wherein the solvent mixture comprises a solvent and a polar additive and injecting the solvent mixture into a subsea well or pipeline.

In another embodiment, the present disclosure provides a method comprising: providing a solvent mixture, wherein the solvent mixture comprises a solvent and a polar additive; contacting a deposit with the solvent mixture; and allowing the solvent mixture to disintegrate the deposit.

BRIEF DESCRIPTION OF THE DRAWINGS

A more complete and thorough understanding of the present embodiments and advantages thereof may be acquired by referring to the following description taken in conjunction with the accompanying drawings.

Figure 1:
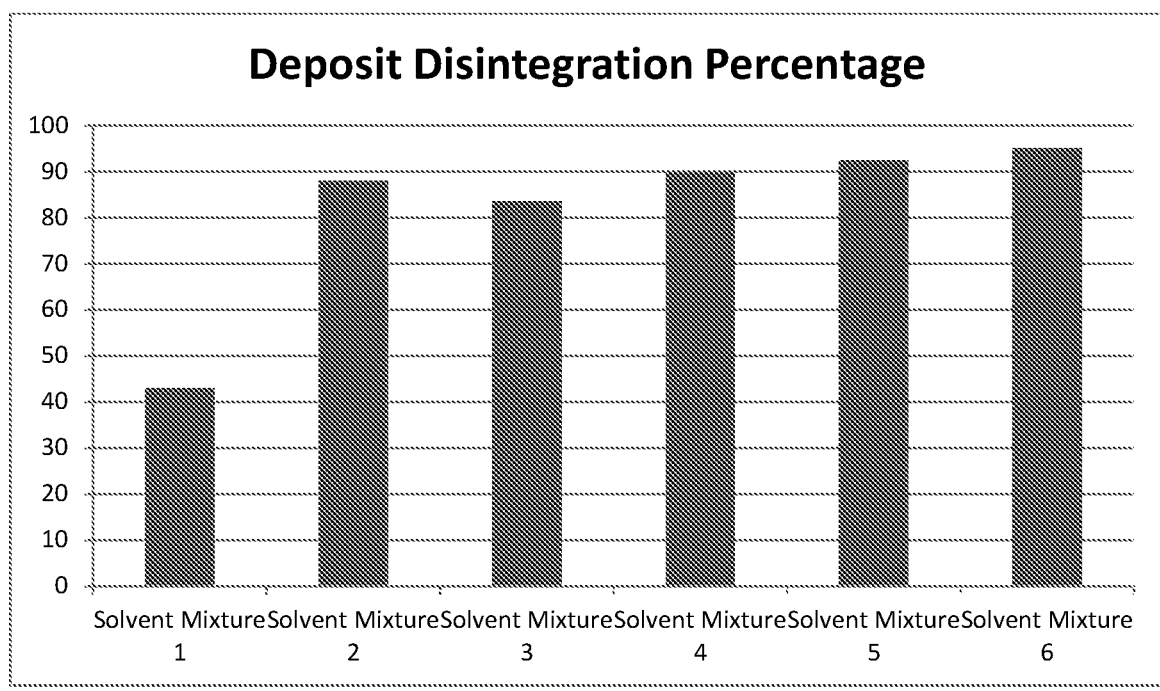
FIG. 1 is a chart showing the effectiveness of different solvent mixtures in disintegrating a deposit.

The features and advantages of the present disclosure will be readily apparent to those skilled in the art. While numerous changes may be made by those skilled in the art, such changes are within the spirit of the disclosure.

DETAILED DESCRIPTION

The description that follows includes exemplary apparatuses, methods, techniques, and/or instruction sequences that embody techniques of the inventive subject matter. However, it is understood that the described embodiments may be practiced without these specific details.

The present disclosure relates generally to deposit disintegrator compositions. More specifically, in certain embodiments, the present disclosure relates to deposit disintegrator compositions useful in disintegrating deposits in subsea oil and gas pipelines and associated methods.

Some desirable attributes of the compositions and methods discussed herein are that they may be more capable of disintegrating a deposit than conventional solvent compositions. In certain embodiments, the solvent mixtures described herein may be tailored to specific deposits by varying the concentration of the polar additives. In certain embodiments, the solvent mixtures described herein are capable of disintegrating deposits that comprise any combination of the following: wax, occluded crude oil, water, inorganics, and production chemicals.

In certain embodiments, the present disclosure provides a solvent mixture comprising a solvent and a polar additive.

In certain embodiments, the solvent may comprise any bulk solvent. In certain embodiments, the bulk solvent may comprise xylene, tetralin, decalin, toluene, terpene, naphtha, or diesel. In certain embodiments, the solvent may comprise a combination of bulk solvents.

In certain embodiments, amount of solvent present in the solvent mixture may be an amount in the range of from 30% to 98% by volume of the solvent mixture. In certain embodiments, amount of solvent present in the solvent mixture may be an amount in the range of from 75% to 95% by volume of the solvent mixture. In certain embodiments, amount of solvent present in the solvent mixture may be an amount in the range of from 80% to 90% by volume of the solvent mixture. In certain embodiments, amount of solvent present in the solvent mixture may be an amount in the range of from 85% to 90% by volume of the solvent mixture.

In certain embodiments, the polar additive may comprise any polar additive. In certain embodiments, the polar additive may comprise a protic polar additive or an aprotic polar additive. In certain embodiments, the polar additive may comprise di-methyl sulfoxide, dimethyl carbonate, dimethyl formamide, or nitromethane. In certain embodiments, the polar additive may comprise a combination of polar additives.

In certain embodiments, the amount of polar additive in the solvent mixture may be an amount in the range of from 2% to 60% by volume of the solvent mixture. In certain embodiments, the amount of polar additive in the solvent mixture may be an amount in the range of from 5% to 20% by volume of the solvent mixture. In certain embodiments, the amount of polar additive in the solvent mixture may be an amount in the range of from 10% to 20% by volume of the solvent mixture. In certain embodiments, the amount of polar additive in the solvent mixture may be an amount in the range of from 10% to 15% by volume of the solvent mixture.

In certain embodiments, the volume ratio of polar additive to solvent in the solvent mixture may be a ratio in the range of from 0.01 to 0.6. In certain embodiments, the volume ratio of polar additive to solvent in the solvent mixture may be a ratio in the range of from 0.05 to 0.2. In certain embodiments, the volume ratio of polar additive to solvent in the solvent mixture may be a ratio in the range of from 0.05 to 0.15. In certain embodiments, the volume ratio of polar additive to solvent in the solvent mixture may be a ratio in the range of from 0.1 to 0.15.

In certain embodiments, the solvent mixture may further comprise a second polar additive. In certain embodiments, the second polar additive may comprise a protic polar additive or an aprotic polar additive. In certain embodiments, the second polar additive may be strongly polar or a moderately polar. In certain embodiments, the second polar additive may comprise di-methyl sulfoxide, methanol, acetone, iso-butanal, or teatrahydrofuran. In certain embodiments, the polar second additive may comprise a combination of second polar additives.

In certain embodiments, the concentration of second polar additive in the solvent mixture may be a concentration in the range of from 2% to 40% by volume of the solvent mixture. In certain embodiments, the concentration of second polar additive in the solvent mixture may be a concentration in the range of from 5% to 15% by volume of the solvent mixture.

In certain embodiments, the solvent mixture may further comprise a second bulk solvent. In certain embodiments, the second bulk solvent may comprise a non-polar solvent. In certain embodiments, the second bulk solvent may comprise naphtha, terpene, decalin, a C5-C11 alkane, diesel, a cyclic aromatic compound, or a bicyclic aromatic compound. In certain embodiments the second bulk solvent may comprise a combination of second bulk solvents.

In certain embodiments, the concentration of second bulk solvent in in the solvent mixture may be a concentration in the range of 2% to 40% by volume of the solvent mixture. In certain embodiments, the concentration of second bulk solvent in in the solvent mixture may be a concentration in the range of 5% to 15% by volume of the solvent mixture.

In certain embodiments, the particular combination of bulk solvent and polar additive (and optionally second bulk solvent and/or second polar additive) present in the solvent mixture may be selected based on the type of deposit to be disintegrated by the solvent mixture. The types of deposits to be disintegrated by the solvent mixture may vary in their relative compositions of wax, entrapped oil, water, asphaltenes, and other inorganics.

In certain embodiments, the solvent mixture may have a density in the range of 0.75 g/cc to 1.1 g/cc. In certain embodiments, the solvent mixture may have a density in the range of from 0.8 g/cc to 1.0 g/cc. In certain embodiments, the solvent mixture may have a density in the range of from 0.85 g/cc to 0.95 g/cc.

In certain embodiments, the present invention provides a method comprising: providing a solvent mixture, wherein the solvent mixture comprises a solvent and a polar additive and injecting the solvent mixture into a subsea well or pipeline.

In certain embodiments, the solvent mixture may comprise any solvent mixture discussed above. In certain embodiments, the solvent mixture may be a specifically tailored solvent mixture. For example, in certain embodiments, the solvent mixture may be tailored based upon the type of deposit to be disintegrated.

In certain embodiments, the solvent mixture may further comprise a dispersing agent and/or a wetting agent. In certain embodiments, the solvent mixture may further comprise a rheology modifier.

In certain embodiments, injecting the solvent mixture into the subsea well or pipeline may comprise injecting the solvent mixture into the subsea well or pipeline by any conventional means. In certain embodiments, the solvent mixture may be injected into the subsea well or pipeline when the subsea well or pipeline is in a shut-in condition. In other embodiments, the solvent mixture may be injected into the subsea well or pipeline while the subsea well or pipeline is in a flowing condition.

In certain embodiments, a deposit site may be identified before the solvent mixture is injected into the subsea well or pipeline. In certain embodiments, the deposit site may be identified by any conventional surveillance method.

In certain embodiments, a spacer fluid may be injected into the subsea well or pipeline before and/or after the solvent mixture is injected into the subsea well or pipeline.

In certain embodiments, the solvent mixture may be injected sequentially with pre-flush and separator blocks. In certain embodiments, different and/or separate solvent mixtures may be injected into the subsea well or pipeline sequentially.

In certain embodiments, the method may further comprise allowing the solvent mixture to contact a deposit. In certain embodiments, the deposit may comprise any combination of the following: wax, occluded crude oil, water, inorganics, and production chemicals. In certain embodiments, the deposit may be located along a sidewall of a pipeline or may be blocking the pipeline. In certain embodiments, the deposit may be located in a valve, a tank, or any other piece of oilfield equipment. In certain embodiments, the method may further comprise allowing the solvent mixture to disintegrate the deposit.

In certain embodiments, the method may further comprise using wire-lining technology and/or pressure pulsing technologies while the solvent mixture disintegrates the deposit.

In certain embodiments, the solvent mixture may be heated to a temperature in the range of from 100° F. to 200° F. before it is injected into the subsea well or pipeline. In certain embodiments, the solvent mixture may be heated to a temperature in the range of from 150° F. to 200° F. before it is injected into the subsea well or pipeline. In certain embodiments, the solvent mixture may be heated to a temperature in the range of from 175° F. to 200° F. before it is injected into the subsea well or pipeline.

In certain embodiments the solvent mixture can be couple with additional methods that help in efficient suspension and flow of the dispersed deposit.

In certain embodiments, the solvent mixture may be recovered after the deposit is disintegrated. In certain embodiments, the solvent mixture may be re-injected into the subsea well or pipeline. In certain embodiments, effluents formed from the disintegration of the deposit may be discarded after the solvent mixture is recovered. In other embodiments, the solvent mixture and effluents may be flown along with the produced fluids without recovery.

In certain embodiments, the present disclosure provides a method comprising: providing a solvent mixture, wherein the solvent mixture comprises a solvent and a polar additive; contacting a deposit with the solvent mixture; and allowing the solvent mixture to disintegrate the deposit.

To facilitate a better understanding of the present invention, the following examples of certain aspects of some embodiments are given. In no way should the following examples be read to limit, or define, the scope of the invention.

EXAMPLES

Example 1

Six 50 mL solvent mixtures with varying ratios of solvent and polar additives were prepared. Solvent mixture 1 comprised 100% xylene. Solvent mixture 2 comprised 90% xylene and 10% methanol. Solvent mixture 3 comprised 95% xylene and 5% di-methyl sulfoxide. Solvent mixture 4 comprised 90% xylene and 10% di-methyl sulfoxide. Solvent mixture 5 comprised 85% xylene and 15% di-methyl sulfoxide. Solvent mixture 6 comprised 80% xylene and 20% di-methyl sulfoxide.

A 1 cm diameter disk comprising 0.2 grams of a gannet deposit was placed into each of the solvent mixtures. The gannet deposits comprised 46% occluded oil, 45% wax, 1% asphaltene, 5% water, and 3% inorganic matter.

The deposits were kept in the solutions for four hours. The deposits were then removed from the solvent mixtures, and the percentage of deposit disintegration was measured and plotted in FIG. 1.

As can be seen by FIG. 1, the solvent mixture comprising 80% xylene and 20% di-methyl sulfoxide outperformed the other solvent mixtures.

Example 2

Six 50 mL solvent mixtures with varying ratios of solvent and polar additives were prepared. Solvent mixture 1 comprised 100% xylene. Solvent mixture 2 comprised 90% xylene and 10% methanol. Solvent mixture 3 comprised 95% xylene and 5% di-methyl sulfoxide. Solvent mixture 4 comprised 90% xylene and 10% di-methyl sulfoxide. Solvent mixture 5 comprised 85% xylene and 15% di-methyl sulfoxide. Solvent mixture 6 comprised 80% xylene and 20% di-methyl sulfoxide.

A 1 cm diameter disk comprising 0.2 grams of Sierra Blanca deposit was placed into each of these solutions. The Sierra Blanca deposits comprised 38% occluded oil, 55% wax, 3% asphaltene, 2% water, and 2% inorganic matter.

The deposits were kept in the solutions for four hours. The deposits were then removed from the solvent mixtures, and the percentage of deposit disintegration was measured and plotted in FIG. 2.

Figure 2:
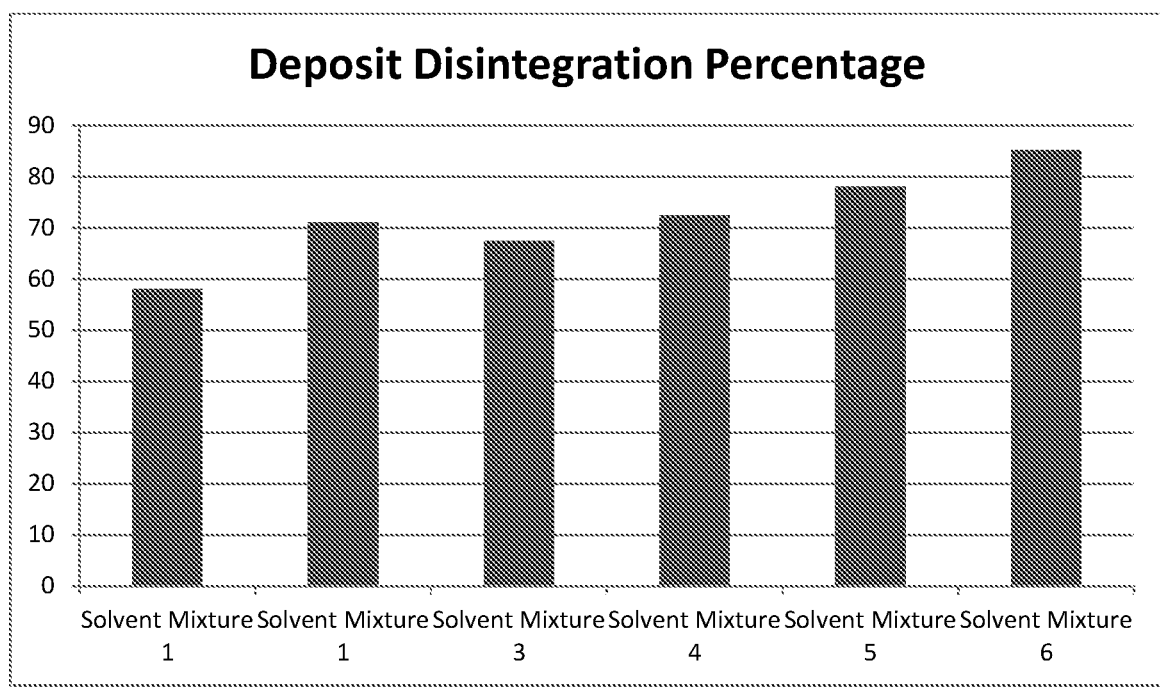
FIG. 2 is a chart showing the effectiveness of different solvent mixtures in disintegrating a deposit.

As can be seen by FIG. 2, the solvent mixture comprising 80% xylene and 20% di-methyl sulfoxide outperformed the other solvent mixtures.

Example 3

Five 50 mL solvent mixtures with varying ratios of solvent and polar additives were prepared. Solvent mixture 1 comprised 100% xylene. Solvent mixture 2 comprised 85% xylene, 10% di-methyl sulfoxide, and 5% methanol. Solvent mixture 3 comprised 80% xylene, 15% di-methyl sulfoxide, and 5% methanol. Solvent mixture 4 comprised 90% terpene, 5% di-methyl sulfoxide, and 5% isobutanol. Solvent mixture 5 comprised 85% tetralin, 10% di-methyl sulfoxide, and 5% methanol.

A 1 cm diameter disk comprising 0.2 grams of a gannet deposit was placed into each of the solvent mixtures. The gannet deposits comprised 46% occluded oil, 45% wax, 1% asphaltene, 5% water, and 3% inorganic matter.

The deposits were kept in the solutions for four hours. The deposits were then removed from the solvent mixtures, and the percentage of deposit disintegration was measured and plotted in FIG. 3.

Figure 3:
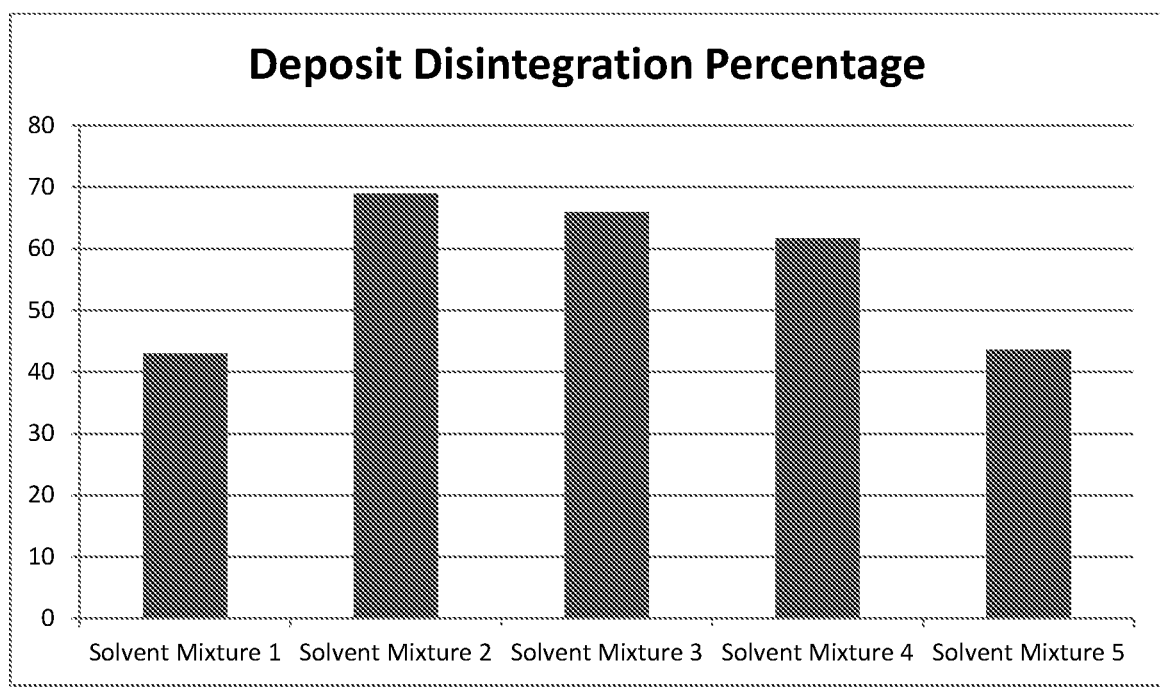
FIG. 3 is a chart showing the effectiveness of different solvent mixtures in disintegrating a deposit.

As can be seen by FIG. 3, the solvent mixture comprising 85% xylene, 10% di-methyl sulfoxide, and 5% methanol outperformed the other solvent mixtures.

Example 4

Five 50 mL solvent mixtures with varying ratios of solvent and polar additives were prepared. Solvent mixture 1 comprised 100% xylene. Solvent mixture 2 comprised 85% xylene, 10% dimethyl sulfoxide, and 5% methanol. Solvent mixture 3 comprised 80% xylene, 15% dimethyl sulfoxide, and 5% methanol. Solvent mixture 4 comprised 90% terpene, 5% dimethyl sulfoxide, and 5% isobutanol. Solvent mixture 5 comprised 85% tetralin, 10% dimethyl sulfoxide, and 5% methanol.

A 1 cm diameter disk comprising 0.2 grams of Sierra Blanca deposit was placed into each of these solutions. The Sierra Blanca deposits comprised 38% occluded oil, 55% wax, 3% asphaltene, 2% water, and 2% inorganic matter.

The deposits were kept in the solutions for four hours. The deposits were then removed from the solvent mixtures, and the percentage of deposit disintegration was measured and plotted in FIG. 4.

Figure 4:
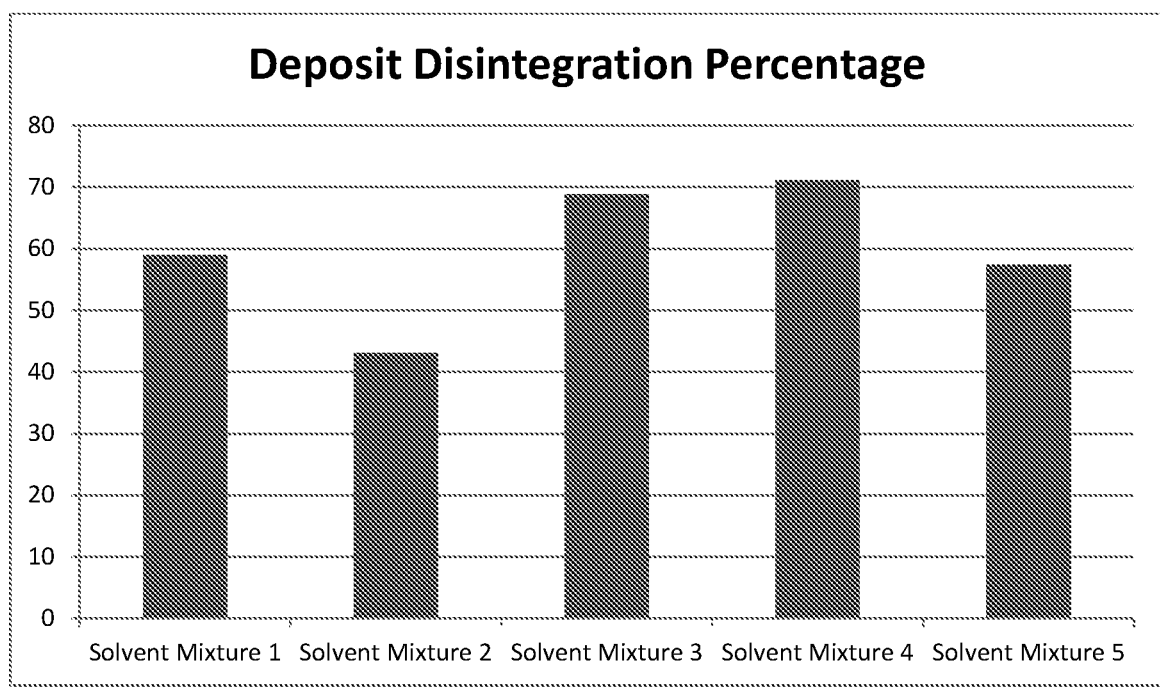
FIG. 4 is a chart showing the effectiveness of different solvent mixtures in disintegrating a deposit.

As can be seen by FIG. 4, the solvent mixture comprising 90% terpene, 5% dimethyl sulfoxide, and 5% isobutanol outperformed the other solvent mixture.

While the embodiments are described with reference to various implementations and exploitations, it will be understood that these embodiments are illustrative and that the scope of the inventive subject matter is not limited to them. Many variations, modifications, additions and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for disintegrating a wax deposit in oil and gas pipelines, the method comprising the steps of:
   identifying a wax deposit site in a subsea pipeline or well;
   providing a solvent mixture, wherein the solvent mixture comprises a non-polar solvent and dimethyl sulfoxide;
   injecting the solvent mixture into the subsea pipeline or well, so that the solvent mixture contacts the wax deposit site be shutting-in the subsea pipeline of well, by providing a spacer fluid before and after the solvent mixture, or a combination thereof;

and allowing the solvent mixture to disintegrate the wax deposit.

2. The method of claim 1, wherein the non-polar solvent is selected from the group consisting of xylene, tetralin, decalin, toluene, terpene, naphtha, diesel and combinations thereof.

3. The method of claim 1, wherein the non-polar solvent is present in the solvent mixture in an amount in the range of from 30% to 98% by volume of the solvent mixture.

4. The method of claim 1, wherein the dimethyl sulfoxide is present in the solvent mixture in an amount in the range of from 2% to 60% by volume of the solvent mixture.

5. The method of claim 1, wherein the volume ratio of dimethyl sulfoxide to non-polar solvent in the solvent mixture is in the range of from 0.01 to 0.6.

6. The method of claim 1, wherein the solvent mixture further comprises a second bulk solvent.

7. The method of claim 6, wherein the second bulk solvent is selected from the group consisting of naphtha, terpene, decalin, a C5-C11 alkane, diesel, a cyclic aromatic compound, a bicyclic aromatic compound, and combinations thereof.

8. The method of claim 7, wherein the second bulk solvent is present in the solvent mixture in an amount in the range of from 2% to 40% by volume of the solvent mixture.

9. The method of claim 1, wherein the non-polar solvent is present in the solvent mixture in an amount in the range of from 75% to 95% by volume of the solvent mixture.

10. The method of claim 1, wherein the dimethyl sulfoxide is present in the solvent mixture in an amount in the range of from 5% to 20% by volume of the solvent mixture.

11. A method for disintegrating a wax deposit in oil and gas pipelines, the method comprising the steps of:
    identifying a wax deposit site in a subsea pipeline or well;
    providing a solvent mixture, wherein the solvent mixture comprises a non-polar solvent selected from the group consisting of xylene, tetralin, terpene, and combinations thereof, and a polar additive;
    injecting the solvent mixture into the subsea pipeline or well, so that the solvent mixture contacts the wax deposit site by shutting-in the subsea pipeline or well, by providing a spacer fluid before and after the solvent mixture, or a combination thereof;
    and allowing the solvent mixture to the wax deposit.

12. The method of claim 11, wherein the non-polar solvent is present in the solvent mixture in an amount in the range of from 30% to 98% by volume of the solvent mixture.

13. The method of claim 11, wherein the polar additive is selected from the group consisting of di-methyl sulfoxide, dimethyl carbonate, dimethyl formamide, nitromethane and combinations thereof.

14. The method of claim 11, wherein the polar additive is present in the solvent mixture in an amount in the range of from 2% to 60% by volume of the solvent mixture.

15. The method of claim 11, wherein the volume ratio of polar additive to non-polar solvent in the solvent mixture is in the range of from 0.01 to 0.6.

16. The method of claim 11, wherein the solvent mixture further comprises a second bulk solvent.

17. The method of claim 16, wherein the second bulk solvent is selected from the group consisting of naphtha, terpene, decalin, a C5-C11 alkane, diesel, a cyclic aromatic compound, a bicyclic aromatic compound, and combinations thereof.

18. The method of claim 16, wherein the second bulk solvent is present in the solvent mixture in an amount in the range of from 2% to 40% by volume of the solvent mixture.

19. The method of claim 11, wherein the non-polar solvent is present in the solvent mixture in an amount in the range of from 75% to 95% by volume of the solvent mixture.

20. The method of claim 11, wherein the dimethyl sulfoxide is present in the solvent mixture in an amount in the range of from 5% to 20% by volume of the solvent mixture.

* * * * *

UNITED STATES PATENT AND TRADEMARK OFFICE
CERTIFICATE OF CORRECTION

PATENT NO. : 11,060,012 B2  
APPLICATION NO. : 16/092420  
DATED : July 13, 2021  
INVENTOR(S) : Nirmal Tatavalli-Mittadar et al.

Page 1 of 1

It is certified that error appears in the above-identified patent and that said Letters Patent is hereby corrected as shown below:

In the Claims

In Column 6, Line 65, in Claim 1, delete "be" and insert -- by --, therefor.

In Column 6, Line 65, in Claim 1, delete "of" and insert -- or --, therefor.

In Column 8, Line 6, in Claim 11, after "to" insert -- disintegrate --.

Signed and Sealed this  
Twenty-first Day of September, 2021

Drew Hirshfeld  
*Performing the Functions and Duties of the*  
*Under Secretary of Commerce for Intellectual Property and*  
*Director of the United States Patent and Trademark Office*